(12) United States Patent
Wu et al.

(10) Patent No.: US 11,313,984 B2
(45) Date of Patent: Apr. 26, 2022

(54) METHOD AND SYSTEM FOR ELECTROMAGNETIC METHOD (EM) SIGNAL DETECTION BASED ON ONSHORE SPARKER SOURCE

(71) Applicant: Institute of Geology and Geophysics, CAS, Beijing (CN)

(72) Inventors: Xin Wu, Beijing (CN); Guoqiang Xue, Beijing (CN); Qingyun Di, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 379 days.

(21) Appl. No.: 16/435,526

(22) Filed: Jun. 9, 2019

(65) Prior Publication Data

US 2020/0386903 A1 Dec. 10, 2020

(51) Int. Cl.
*G01V 1/157* (2006.01)
*G01V 1/22* (2006.01)

(52) U.S. Cl.
CPC .............. *G01V 1/157* (2013.01); *G01V 1/22* (2013.01)

(58) Field of Classification Search
CPC .......... G01V 1/157; G01V 1/22; G01V 11/00; G01V 2210/1425; G01V 2210/121; G01V 2210/1295; G01V 1/003
See application file for complete search history.

(56) References Cited

U.S. PATENT DOCUMENTS

| 7,106,065 B1* | 9/2006 | Graf | G01V 3/12 324/337 |
| 10,838,099 B1* | 11/2020 | Wu | G01V 3/16 |
| 2006/0153004 A1* | 7/2006 | Berg | G01V 3/265 367/37 |
| 2008/0002522 A1* | 1/2008 | Berg | G01V 1/00 367/14 |
| 2020/0348438 A1* | 11/2020 | Xue | G01V 3/16 |
| 2020/0363556 A1* | 11/2020 | Wu | G01V 3/165 |
| 2020/0386903 A1* | 12/2020 | Wu | G01V 1/003 |

FOREIGN PATENT DOCUMENTS

| AU | 2020101013 A4 * | 7/2020 |
| AU | 2020101108 A4 * | 7/2020 |
| CN | 104502980 A * | 4/2015 |

* cited by examiner

*Primary Examiner* — Daniel Pihulic (57) ABSTRACT

A method and system for electromagnetic method (EM) signal detection based on an onshore sparker source, the method including: arranging an EM signal detection system near a sparker source; releasing, by the sparker source, an electromagnetic pulse concomitantly in a discharge and mechanical energy output process; observing an electromagnetic response generated by the earth under the excitation of the electromagnetic pulse by means of the EM signal detection system for extracting distribution information of geo-electrical parameters; when the sparker source moves, moving the electromagnetic method signal detection system to a new position along with the sparker source while keeping their positions relative to each other unchanged; and repeating the above process after the movement is completed. According to the technical solution of the present invention, fine electromagnetic detection results can be obtained while seismic detection is carried out.

4 Claims, 12 Drawing Sheets

METHOD AND SYSTEM FOR ELECTROMAGNETIC METHOD (EM) SIGNAL DETECTION BASED ON ONSHORE SPARKER SOURCE

FIELD OF THE INVENTION

The invention relates to the field of geophysical exploration, and in particular to a method and system for electromagnetic method (EM) signal detection based on an onshore sparker source.

BACKGROUND

Figure 1:
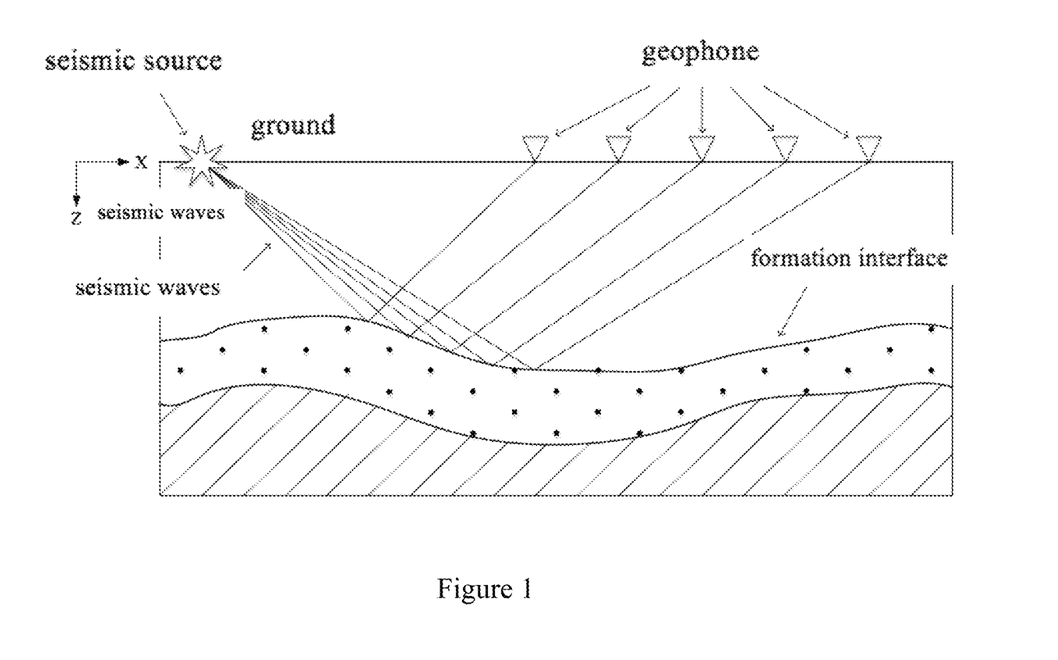
FIG. 1 is a schematic diagram of the artificial source seismic exploration method as a related art.

The traditional artificial source seismic exploration method, by adopting mechanical waves released from a seismic source to excite the earth, as shown in FIG. 1, wherein a geophone array is arranged on the ground and seismic waves reflected to the ground through internal structures of the earth are observed so as to extract the underground structural information, has been found to be widely applied to exploration of oil, natural gas and other resources, and in recent years, to the fields of metal ore exploration, engineering geological exploration, regional geological research and the like.

Traditionally, the artificial source seismic method uses explosive as the seismic source, with signals having the advantages of large energy, sharp pulse, and being able to control the formation of air waves and surface waves by controlling the depth of explosion; however, this method has irrevocable damage and harm to the environment. Therefore, gradually different types of non-explosive seismic sources have emerged all around the world, including, typically, hydraulic vibroseises, air gun seismic sources and sparker sources.

The hydraulic vibroseis, based on technologies including hydraulic servo control, hydraulic transmission, automatic control and electronic control, with hydraulic, mechanical and electronic technologies integrated, is oil and gas exploration equipment with high technological quality. Through an electric control system thereof, a hydraulic vibroseis generates required linear or nonlinear sine frequency modulation signals which are amplified through an electro-hydraulic servo system to control the enablement of a main valve of a servo valve, and high-pressure hydraulic oil drives a vibrator hammer body to do reciprocating motion so that the generated seismic wave signals are transmitted to the earth.

The air gun seismic source, generally applied to marine exploration and deemed as a green and environment-friendly artificial seismic source, works by releasing a large amount of high-pressure gas into a water body in a very short time, and thus creating strong impact upon on the surrounding water which generates in turn mechanical oscillation of expansion and contraction so as to form an excitation signal.

The sparker source is a non-explosive source which converts electric energy into pulse kinetic energy and works by releasing the electric energy stored in capacitor by breakdown discharge process in liquid environment through specially made discharge electrodes, and generating strong pulse pressure to form artificial source. This method has the advantages of simple and convenient construction, safety, high efficiency, good signal repeatability, and stable wavelet and bandwidth, being environmental friendly and economical, etc. Currently, the sparker source is widely used in geology and oil and gas exploration.

The essence of the sparker source energy release process is to convert the electric energy stored by the system into other forms of energy. For a long time, the attention on the research and application of the sparker source has mainly been paid to the mechanical energy released in the discharge process, with other energy forms including thermal energy, chemical energy and electromagnetic energy ignored.

The traditional geophysical method using electromagnetic pulses as the excitation source belongs to the time-domain electromagnetic method, which is based on the electromagnetic induction principle and the physical property difference such as the conductivity of the underground medium and the like, observes the responsive electromagnetic field (namely the secondary field) generated by the earth after the excitation pulse is switched off, analyzes the space-time distribution pattern of the secondary field, and achieves the extraction of the underground structural information finally. And the time-domain electromagnetic method is widely applied to the fields of investigation of mineral resources, underground water and geothermal resources, as well was geological mapping, environmental engineering and the like.

However, traditional artificial source seismic method and electromagnetic method are two completely different methods, the equipment used completely irrelevant, and the survey processes completely independent from each other. Therefore, if it is desired to solve the difficulties encountered in the artificial source seismic method using the electromagnetic method, another survey using completely different equipment in the same survey area has to be performed, in which case, apart from being time-consuming and labor-consuming, the shallow subsurface electrical environment may also vary during the two surveys.

SUMMARY OF THE INVENTION

In view of the above, the present invention has been made. It's an object of the invention to provide a method and system for electromagnetic method (EM) signal detection based on an onshore sparker source, the method including: arranging an EM signal detection system near a sparker source, wherein the sparker source releases an electromagnetic pulse concomitantly in a discharge and mechanical energy output process; observing an electromagnetic response generated by the earth under the excitation of the electromagnetic pulse by means of the EM signal detection system for extracting the distribution information of the geo-electrical parameter; when the sparker source moves, moving the electromagnetic method signal detection system to a new position along with the sparker source while keeping their positions relative to each other unchanged; and repeating the above process after the movement is completed.

An EM signal detection system according to another aspect of the present invention includes: the sparker source, releasing mechanical energy to excite the earth and also releasing electromagnetic energy in the form of electromagnetic pulses in a discharge process; and a response observation device, used for observing, at a specified position, an electromagnetic response signal generated by the earth under the excitation of the electromagnetic pulse.

According to the technical solution of the invention, the electromagnetic field pulse released by the sparker source is used as an excitation source, and a responsive magnetic field and/or an electric field signal generated by the excitation to the earth can be observed; in addition, the electromagnetic field pulse generated by the sparker source has the advantages of large signal amplitude, high spectrum resolution, large bandwidth and the like, as a result, more precise electromagnetic detection results can be obtained.

Further beneficial effects may arise from the technical solution of the invention: the electromagnetic method and the artificial source seismic method are combined, so that two detection methods which are completely independent originally can be conducted in once detection, and two types of data with high coupling degree are obtained.

These and other advantages of the present invention will become more apparent from the following detailed description of the preferred embodiments of the invention taken in conjunction with the accompanying drawings.

BRIEF DESCRIPTION OF THE DRAWINGS

The invention may be better understood by reference to the following description taken in conjunction with the accompanying drawings, in which the same or similar reference numerals are used throughout the drawings to refer to the same or similar parts. The accompanying drawings, which are incorporated in and form a part of this specification, together with the detailed description below, serve to further illustrate preferred embodiments of the invention and to explain the principles and advantages of the invention. In the drawings.

A person skilled in the art may appreciate that elements in the drawings are illustrated for simplicity and clarity and have not necessarily been drawn to scale. For example, the dimensions of some of the elements in the drawings may be exaggerated relative to other elements to help facilitate understanding of embodiments of the present invention.

DETAILED DESCRIPTION OF THE EMBODIMENTS

In order to further illustrate the objects, technical solutions, and advantages of the present invention, embodiments thereof will be described in detail hereinafter with reference to the accompanying drawings. It should be noted that the embodiments and features in the embodiments of the present application may be arbitrarily combined with each other without conflict.

According to an aspect of the invention, the invention provides a method for electromagnetic method (EM) signal detection based on onshore sparker source, including: arranging an EM signal detection system near a sparker source, releasing, by the sparker source, an electromagnetic pulse concomitantly in a discharge and mechanical energy output process; observing an electromagnetic response generated by the earth under the excitation of the electromagnetic pulse by means of the EM signal detection system for extracting the distribution information of the geo-electrical parameter; when the sparker source moves, moving the electromagnetic method signal detection system to a new position along with the sparker source while keeping their positions relative to each other unchanged; and repeating the above process after the movement is completed.

Figure 2:
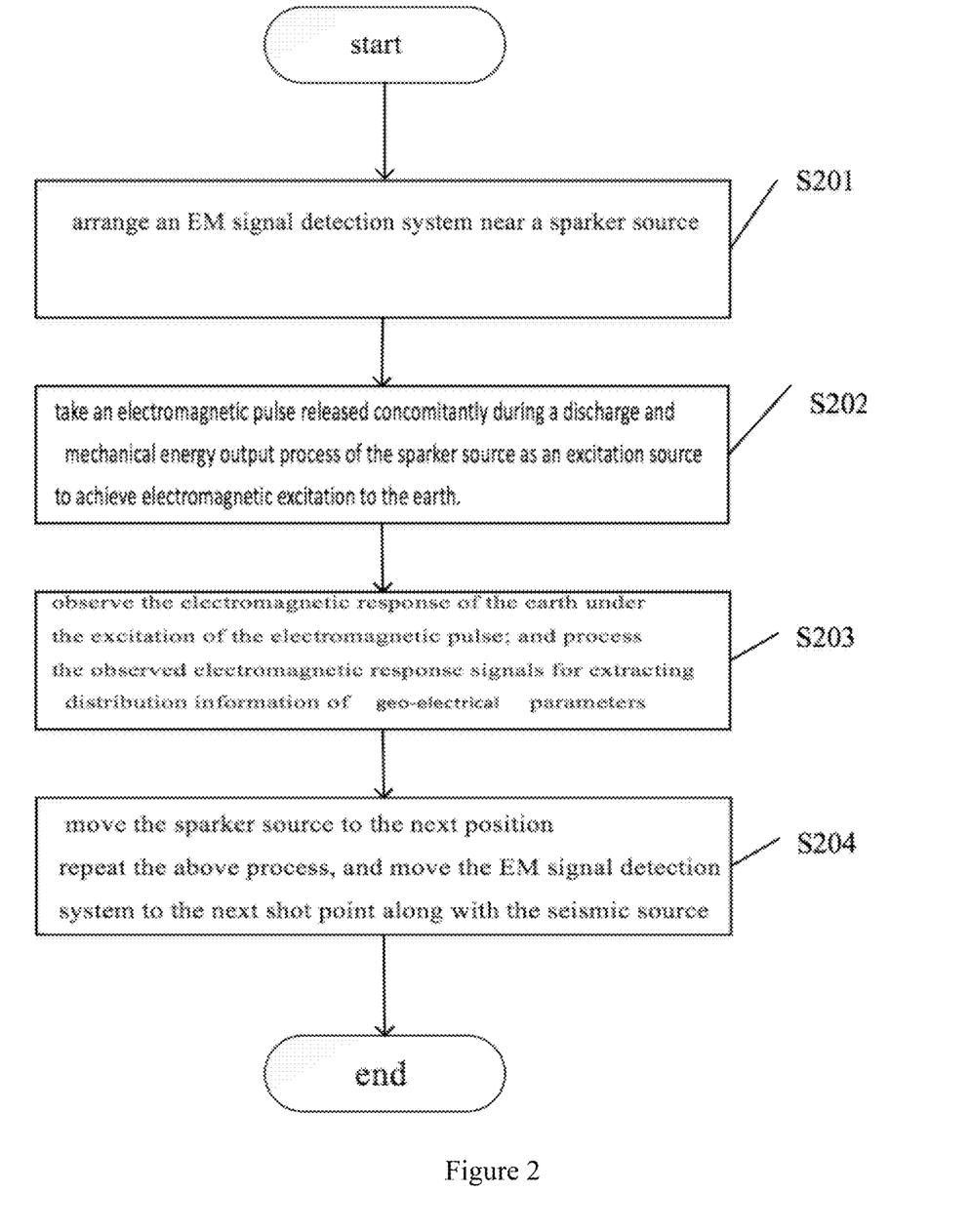
FIG. 2 is a flowchart of an EM signal detection method based on an onshore sparker source according to an embodiment of the present invention.

The EM signal detection method according to an aspect of the present invention will now be described with reference to the accompanying drawings. As shown in FIG. 2, the method specifically includes the steps of:

S201, arranging an EM signal detection system near a sparker source;

S202, taking an electromagnetic pulse released concomitantly during a discharge and mechanical energy output process of the sparker source as an excitation source to achieve electromagnetic excitation to the earth;

where the sparker source is a non-explosive source with excellent performance which, traditionally, only uses the mechanical energy released by a spark discharge process to excite the earth; apart from mechanical energy, the sparker source will, during operation, release other energies wherein thermal energy and chemical energy are rapidly absorbed by the discharge environment, while electromagnetic energy can diffuse outward in the form of electromagnetic pulses; and the applicant has found that a sparker source can be regarded as a generator of electromagnetic pulses, with the output pulse thereof having generally consistent bandwidth with that in the case where the conventional time-domain electromagnetic method is applied; therefore, the electromagnetic pulse generated by the sparker source in the discharge process can be used as an excitation source in the electromagnetic method;

S203, observing the electromagnetic response of the earth under the excitation of the electromagnetic pulse by means of a response observation device used for observing and recording the earth responsive electromagnetic field in the EM signal detection system; and processing the observed electromagnetic response signals for extracting the distribution information of the geo-electrical parameters;

where according to this embodiment, electromagnetic field pulses released by a sparker source are used as excitation sources, and responsive magnetic fields and/or electric field signals generated by the earth under the excitation are observed; and S204, moving the sparker source to the next position, and repeating the above process;

where after the detection at current shot point is finished, the EM signal detection system moves to the next shot point along with the seismic source; and setting observation points in the same manner to carry out magnetic field and/or electric field signal observation, and so on until all shot points are traversed by the EM signal detection system along with the seismic source;

in the observation process, an observation point array (an observation array setting method will be described in detail below) is arranged with the position of the sparker source (i.e., shot point position) as the center, and observing the earth response signal at the observation point by using the EM signal detection system; where the method may further include the steps of: judging whether the sparker source has completed the excitation tasks at all designed positions, executing the step S204 when it's judged not, and otherwise ending the processing;

wherein mechanical waves of the sparker source are adopted to excite the earth, a seismic wave response signal is detected through one or more geophones and has a high coupling degree with the electromagnetic response signal, with both signals able to be jointly used.

According to the embodiment of the invention, electromagnetic detection accompanying artificial source seismic detection is realized by means of an artificial source seismic detection seismic source. The artificial source seismic detection provides a set of seismic data, and the electromagnetic detection provides a set of electromagnetic data on the basis of the electromagnetic data, namely two sets of data which reflect different physical properties of the earth and have a high coupling degree are obtained through once detection, so that not only the detection process is more economical and efficient, but also the reliability of the detection result is effectively improved through the combined use of two different geophysics parameter information carried by the two sets of data.

Preferably, the above method further includes: observing and recording the actual current waveform of the sparker source discharge process through the waveform recording device.

Preferably, the above method may further include: sending a synchronous control signal to a sparker source, a response observation device and a waveform recording device through a control unit, wherein the response observation device includes an electromagnetic sensor and an acquisition unit in an EM signal detection system. The synchronous control signal appoints working time of a sparker source, a response observation device and a waveform recording device: the response observation device and the waveform recording device are started before the sparker source discharges, and stop working after the sparker source discharges for a period of time.

In order to observe the earth response electromagnetic signal during the whole discharge process of the sparker source and within a period of time after the discharge is finished, and monitor the actual current waveform during the whole discharge process of the sparker source and within a period of time after the discharge is finished, it is necessary to start recording data before the sparker electrode discharges and continuously observe for a long enough time.

In order to realize the above observation process, there are two forms of time sequence appointments modes to:

1) appoint working time of a response observation device and a waveform recording device: the time at which recording of data is started is $t_0$, and the time at which recording of data is stopped is $t_2$. It is appointed that the time at which the sparker electrode discharges is $t_1$. Therefore, the EM signal detection system starts to record data at the time $t_0$, then the sparker electrode discharges at the time $t_1$, with the whole discharge process and the time requirement for observing response data taken into consideration, the EM signal detection system stops recording at the time $t_2$ after the response data is guaranteed to disappear completely. It should be noted that it is necessary to set the time when the observation stops, which is actually a key parameter to control the amount of effective observation data; and 2) appoint working time of a response observation device and a waveform recording device: the time at which recording of data starts is $t_0$, and the time at which recording of data stops is $t_0+\Delta_2$. It is appointed that the time at which the sparker electrode discharges is $t_0+\Delta_1$. This is a relative-time setting method, and $\Delta_1$ and $\Delta_2$ are two preset time spans ($\Delta_1$ is much shorter than $\Delta_2$). According to the method, only one absolute time to needs to be given every time, and other two time points can be calculated by adopting preset time interval parameters.

Both control strategies have advantages. The second mode only needs one absolute time given every time, and the first mode needs absolute time of all the three time points given; the second is simple, and the first is more flexible. In practice, two strategies can be used in combination.

Figure 3:
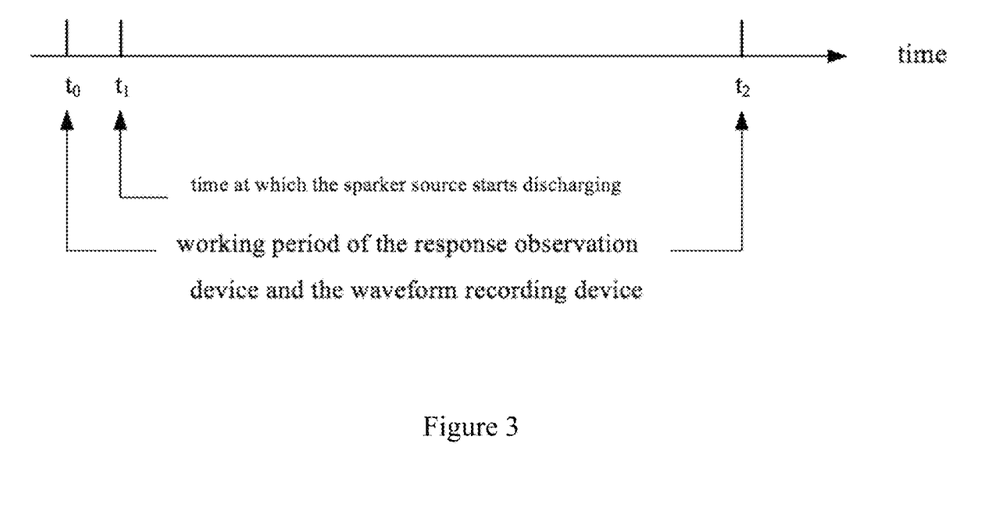
FIG. 3 is a schematic diagram of the timing sequence for observing electromagnetic response signals according to an embodiment of the present invention.

FIG. 3 shows a working time diagram of the response observation device, the waveform recording device and the sparker source under the control of the control unit. As shown in FIG. 3, the control unit sends a control signal to the response observation device and the waveform recording device, and a time in the future is appointed to be the observation starting point time $t_0$, at which the response observation device and the waveform recording device will start working. The response observation device and the waveform recording device will stop working at time $t_2$ (or at $t_0+\Delta_2$) either as preset or as otherwise appointed in the control signal.

The control unit sends a control signal to the sparker source, and appoints to start discharging at a certain time t1 in the future. Alternatively, the time interval $\Delta_1$ may be preset, and the starting time t0 of the response observation device and the waveform recording device is notified to the sparker source, and the sparker source will automatically start discharging at the time $t_0+\Delta_1$ as preset.

Figure 4:
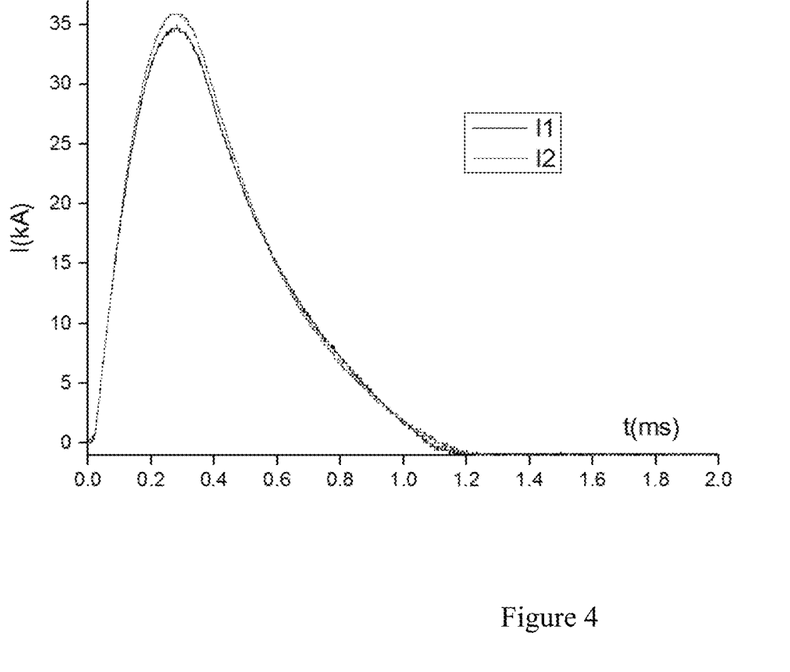
FIG. 4 is a discharge current waveform of sparker source according to an embodiment of the present invention.

A large current Hall sensor (or other large current waveform recording device) can be used to observe the current pulse waveform of the sparker source discharge process. FIG. 4 is a waveform of a current pulse ($I_1$ for the first time and $I_2$ for the second time) for two successive discharges, with an amplitude of about 35 kA and a pulse length of about 1.2 ms.

According to the method provided by the embodiment of the invention, the electromagnetic pulse generated by the sparker source discharge is used as an excitation source to carry out electromagnetic detection, and on the basis of the traditional artificial source seismic method based on the sparker source, the mechanical energy and the electromagnetic energy released by the sparker source are simultaneously used to obtain two types of data by once detection, so that a more reliable and more precise detection result can be obtained.

Combining electromagnetic method with artificial source seismic method becomes an effective means to solve various problems in oil and gas exploration. Because the electromagnetic method and the artificial source seismic method depend on different wave fields, the characteristics of electromagnetic field propagation can be used for improving the exploration efficiency of the artificial source seismic method, for example: when the seismic waves encounter the high-speed layer, most of the energy is reflected back to the ground by the seismic waves, with little penetrating thereunder, but the electromagnetic field is not affected in this situation; as another example: the ability of seismic method to distinguish oil from water in rock cavity is not strong, but electromagnetic method is very sensitive to the difference of resistivity between oil and water; in addition, it's reported that the seismic method in desert area is subjected to static correction by the electromagnetic method. It can be seen that using the electromagnetic pulse generated in the discharge process of the sparker source as an excitation source, with two types of data obtained by both the electromagnetic method and the artificial source seismic method from once excitation may not only render a more economical and efficient detection process, but also effectively improve the reliability of the detection result because of a high coupling between the two types of data.

According to another embodiment of the invention, the invention also provides an EM signal detection system based on an onshore sparker source, characterized by including: a sparker source, releasing mechanical energy to excite the earth and meanwhile also releasing electromagnetic energy in the form of electromagnetic pulses in a discharge process; and a response observation device, used for observing, at a specified position, an electromagnetic response signal generated by the earth under the excitation of the electromagnetic pulse.

Figure 5:
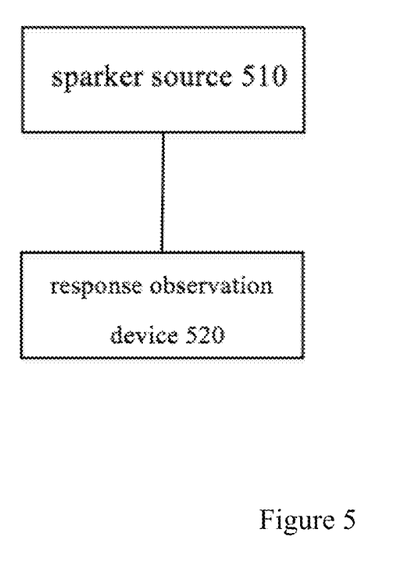
FIG. 5 is a schematic diagram of an EM signal detection system based on an onshore sparker source according to an embodiment of the present invention.

FIG. 5 shows a configuration diagram of an EM signal detection system according to an embodiment of the present invention. As shown in FIG. 5, the EM signal detection system includes: a sparker source 510, used for simultaneously releasing mechanical energy and electromagnetic energy to excite the earth, and a response observation device 520, used for observing electromagnetic response signals generated by the earth under the excitation of electromagnetic pulse.

Preferably, the system further includes: a waveform recording device, used for observing and recording the actual current waveform of the sparker source discharge process. The current waveform observation device further includes: a current waveform recording sensor, used for observing the current waveform of the sparker source discharge; and a current waveform recording unit for recording the current waveform. The working time of the waveform recording device is appointed by the synchronization control signal transmitted by the control unit.

Preferably, the system may further include a control unit for enabling synchronous control of the sparker source, the response observation device and the waveform recording device. The above description may teach how to specifically set the working time.

Preferably, the response observation device may include: an electric field sensor and/or a magnetic field sensor; and an acquisition unit, used for observing the electric field or the magnetic field, or simultaneously observing the electric field and the magnetic field.

Available options for sensors include: single-component or multi-component inductive magnetometers, and single-component or multi-component electric field sensors. The acquisition unit may employ a multi-channel signal acquisition unit which can observe at least only a single-component electric field or a single-component magnetic field and at most a three-component electric field and a three-component magnetic field simultaneously, depending on the sensor used.

Figure 6:
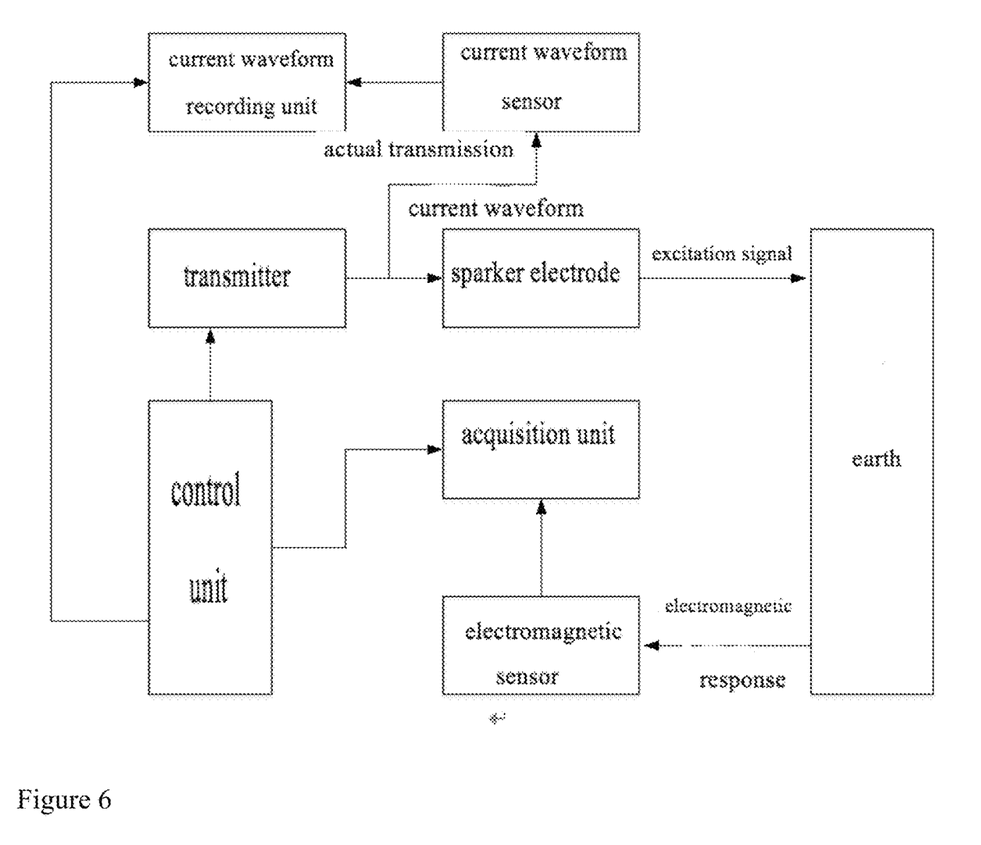
FIG. 6 is a further block diagram of components for a sparker source-based EM signal detection system according to an embodiment of the present invention.

The resulting system configuration diagram is shown in FIG. 6: the device is controlled by a control unit and is used for realizing synchronous control of a sparker source, a response observation device and a waveform recording device. It should be noted that it is not necessary to set the synchronization unit, and a person skilled in the art could set other or no synchronization units according to practical requirements.

And after receiving the synchronous signal, the transmitting system controls the sparker electrode to discharge so as to excite the earth. In the sparker electrode discharge process, the waveform recording device observes and records the actual current waveform of the sparker source discharge process. When more than one sparker electrode is used for discharging, each sparker electrode circuit needs to use one current waveform sensor to observe the actual transmission current waveform, and the observation result is transmitted to the transmission current waveform recording unit.

And the other path of the synchronous signal is transmitted to an acquisition unit contained in the response observation device to control the acquisition unit to synchronously record the earth response observed by the electromagnetic sensor. In a single excitation, the system sends a certain appointed time at which the acquisition system starts recording data, and the transmission system starts discharging a period of time later so as to ensure that the acquired data contain the whole discharge process. The whole electromagnetic response observation process lasts for a period of time, and then the acquisition system stops acquiring.

Preferably, the system may further include: a geophone, used for detecting an earth response signal reflected to the ground through the underground structure after the sparker source sends mechanical waves, and extracting underground structure information.

Figure 7:
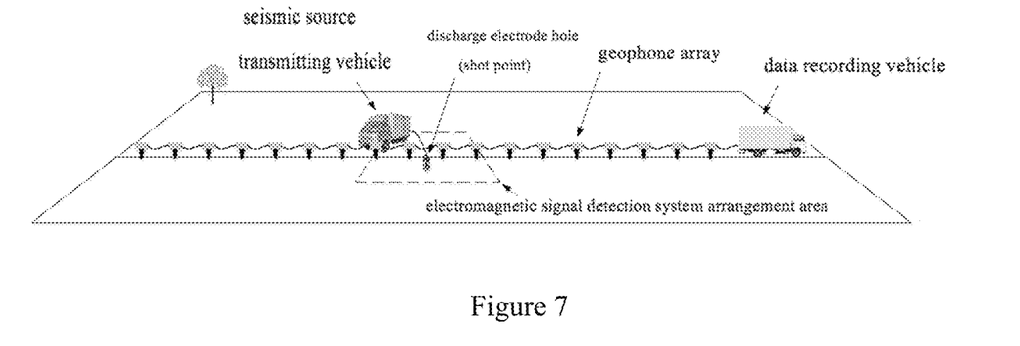
FIG. 7 is a diagram showing a layout area of an EM signal detection system according to an embodiment of the present invention.

As shown in FIG. 7, the EM signal detection system is arranged in a limited area around and with the current shot point as a center.

Figure 8:
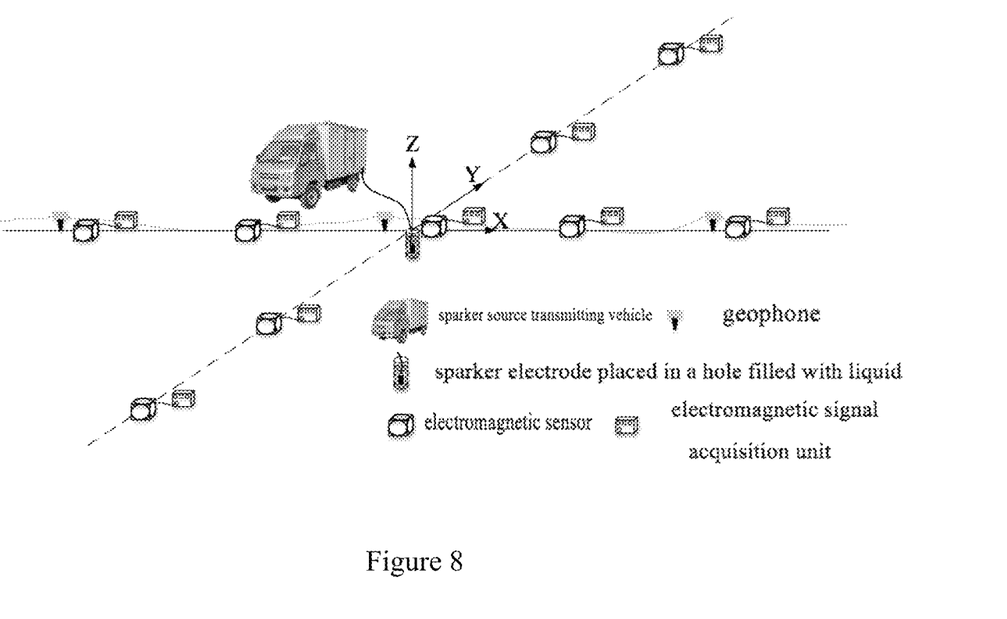
FIG. 8 is a schematic view showing a detailed arrangement of an electromagnetic signal detecting device according to an embodiment of the present invention.

FIG. 8 is a detailed layout schematic diagram of an electromagnetic signal detection device in an area where an EM signal detection system is arranged.

In the embodiment of the invention, a single shot point is taken as the center, around which an electromagnetic response observation point array is arranged in a limited area, and an electromagnetic signal detection device is arranged, so as to observe electromagnetic response signals generated by exciting the earth by electromagnetic pulses released by a sparker source.

When the seismic system only uses one sparker discharge electrode as a source, an electromagnetic signal observation array is designed with the position of the electrode as the origin of the local coordinate system; when the seismic system uses a plurality of spark discharge electrodes, an electromagnetic signal observation array is designed with the geometric center position of all electrode holes as the origin of the local coordinate system.

After the origin position of the local coordinate system is determined, the trending direction of the geophone array is taken as the X direction, and the direction perpendicular to the trending direction of the geophone array is taken as the Y direction (i.e., the direction of the shot-point line in the three-dimensional seismic).

The electromagnetic signal observation point array can be independently arranged in the X direction or the Y direction, and can also be simultaneously arranged in the X direction and the Y direction. The electromagnetic response signal observation points are arranged along the same direction at constant intervals each of which is not more than half of the distance between adjacent geophones (i.e., "track interval"). The radius of the arrangement area of the electromagnetic response observation point array is generally not larger than the shot distance of the seismic source.

After the sparker source finishes the excitation at the current shot point, the EM signal detection system moves to the next shot point along with the source, an observation point is arranged in the same manner, and observation of earth responsive magnetic field and/or electric field signal is carried out, and so on until all shot points are traversed by the EM signal detection system along with the seismic source.

At a single observation point, a single-component or multi-component magnetic field and/or electric field response observation device (including a sensor and an acquisition unit) can be placed to observe the induction magnetic field and/or electric field response signals of the earth medium generated under the excitation by a sparker source.

In the observation process, the sparker source, the response observation device and the waveform recording device are subjected to a high-precision synchronous control, so that a full-waveform synchronous observation of the earth response signal generated under the electromagnetic pulse excitation by the sparker source and the discharge pulse current waveform of the sparker source is realized.

Therefore, the control unit is used for sending synchronous control signals to the sparker source, the response observation device and the waveform recording device, and the time for the response observation device and the waveform recording device to start and stop working and the time for the sparker source to discharge are appointed.

Figure 9:
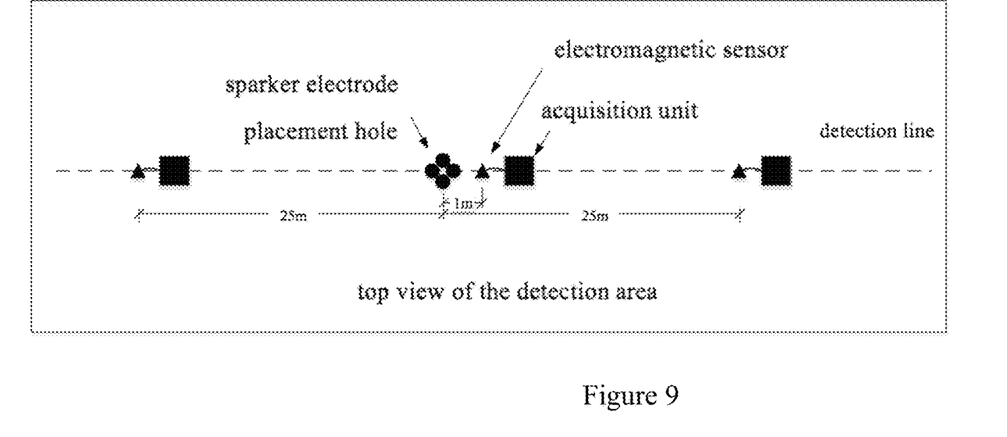
FIG. 9 is a plan view of a detection area design according to an embodiment of the present invention.

A specific example of setting an electromagnetic signal observation system to extract geodetic structure information according to one embodiment of the present invention is described below. As shown in FIG. 9, detection lines are arranged in the X direction; and the sparker source transmitting device used is a set of metal ore phased array sparker source. The source adopts arc discharge, with the energy stored by a single emission module being 50 kJ, the maximum working voltage being 10 kV, and the total transmission energy can be increased through a multi-module combined excitation mode. In actual transmission, four transmitting modules were used, with each having a transmission voltage of 7500 V, the average peak value of a transmission current pulse being 35 kA, and a pulse length being about 1.3 ms.

The observation is carried out in the vicinity of the shot point, and there are three observation positions, one of which are located 1 meter from the edge of the shot point, the other two of which are located at the two sides of the shot point respectively, either in a 25-meter distance from the shot point. A multi-channel acquisition unit is placed at each observation point, with a sampling rate of 500 kHz and a system dynamic range of 140 dB. A three-axis induction magnetic field sensor is adopted to carry out magnetic field response observation, wherein the main parameters of each axis are the same: the resonant frequencies are 45 kHz and the noise level is 0.1 nT/s. In addition, a three-axis non-contact electric field sensor is used for carrying out electric field response observation, and the main parameters of each axis are the same: the sensor bandwidth is 1 Hz-30 kHz and the noise level is 100 nV@1 kHz.

Figure 10:
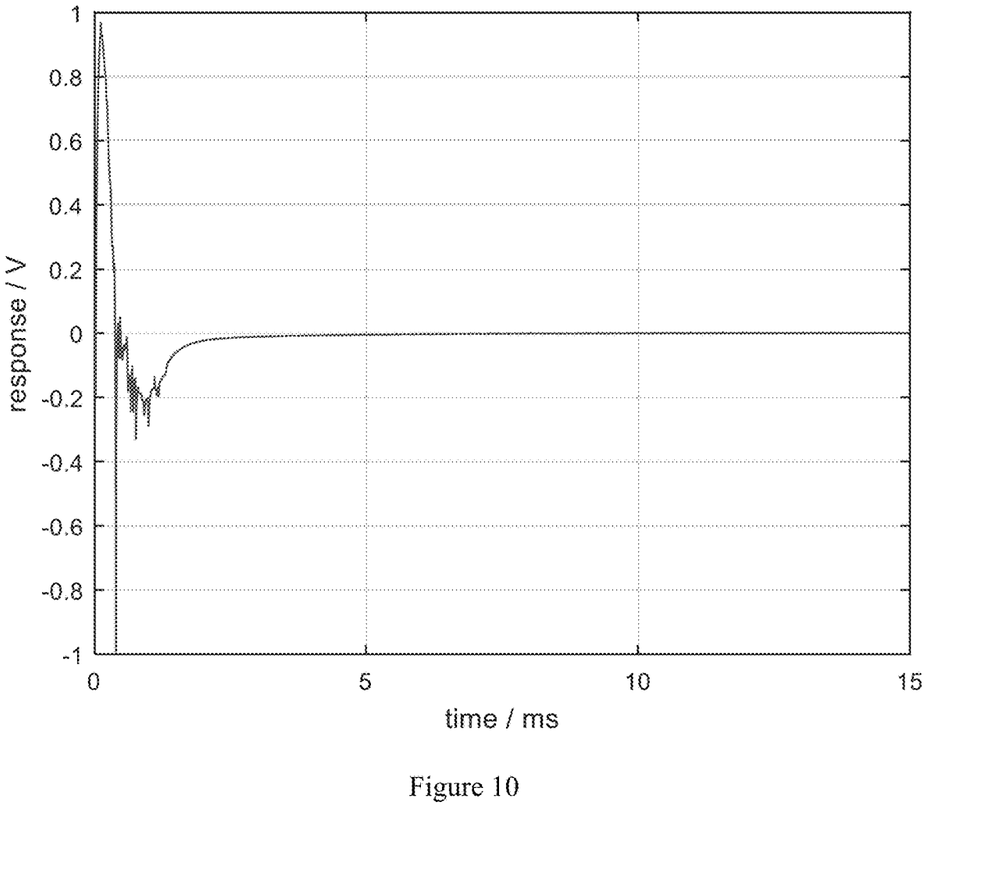
FIG. 10 is a full-wave response of an X-axis magnetic field according to an embodiment of the present invention.
Figure 11:
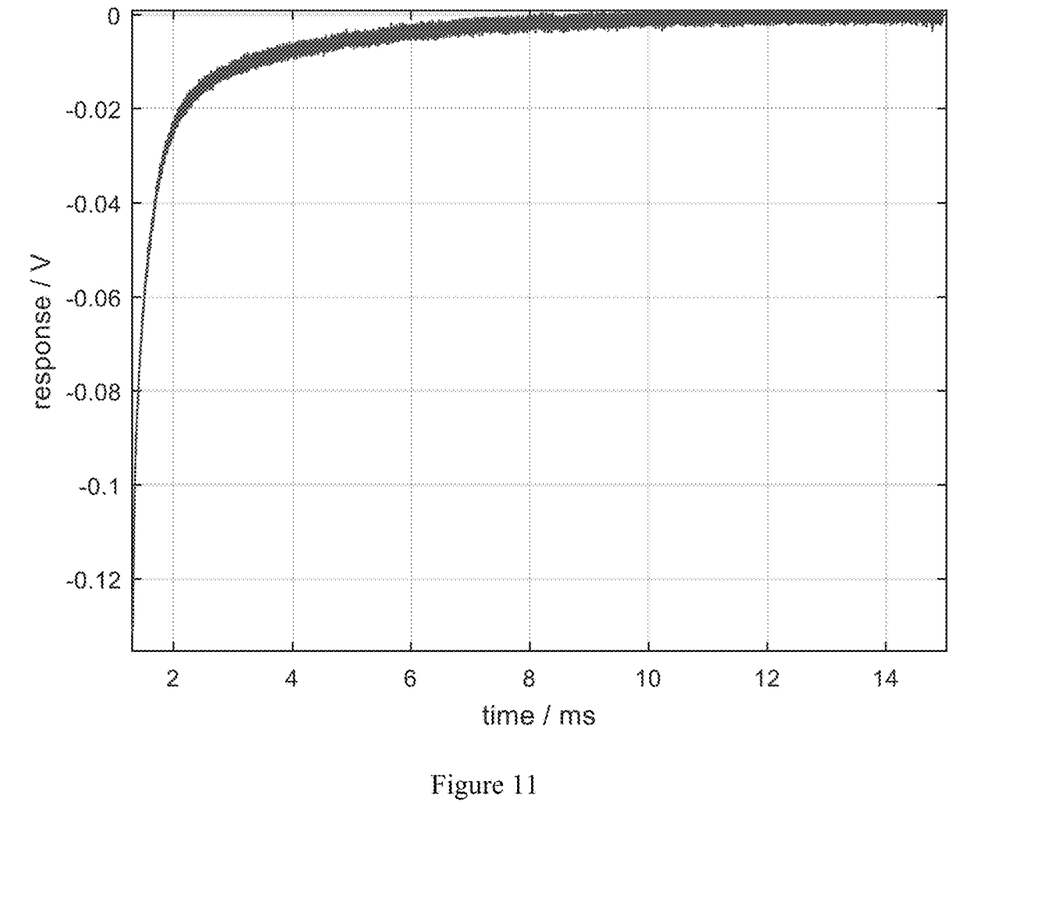
FIG. 11 is a response of an X-axis magnetic field after 1.3 ms according to an embodiment of the present invention.

The X-axis magnetic field response obtained at the point 25 meters away on the right side is taken as an example, the full waveform response is shown in FIG. 10, and it can be seen that the discharge pulse duration of the sparker source is about 1.3 ms. The data after 1.3 ms is selected, as shown in FIG. 11. With 1.3 ms taken as the time zero, a minus is put before each of the data thereafter, and the response curve after discharge pulse is redrawn using double logarithmic coordinates as shown in FIG. 12.

Figure 12:
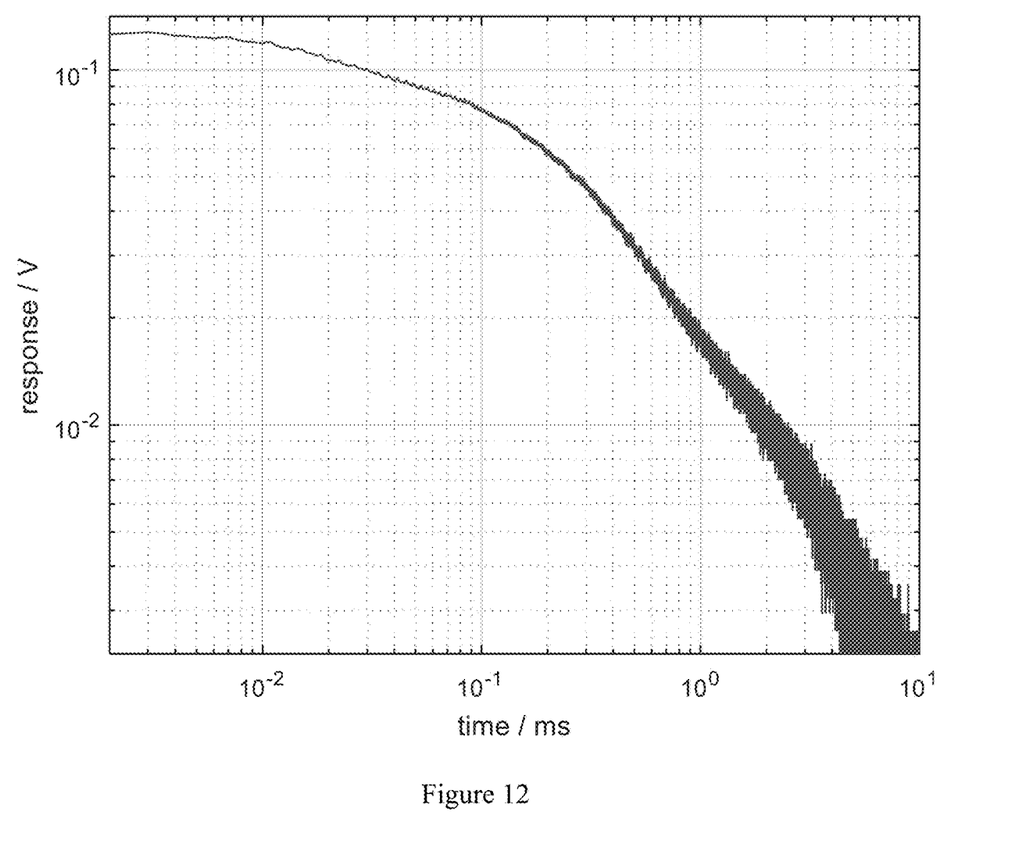
FIG. 12 is a response (double logarithmic coordinate) of an X-axis magnetic field after 1.3 ms according to an embodiment of the present invention.

As shown in FIGS. 11 and 12, the observed response has an exponential decay characteristic similar to that of the transient electromagnetic response, and the decay curve with sufficient signal-to-noise ratio obtainable by the data processing has duration of at least 10 ms. The accurate extraction of the distribution information of the geo-electrical parameters can be realized by modeling the response, introducing imaging and inversion methods.

Although the disclosed embodiment of the present invention has been described above, it is to be understood that the description is by way of example only and is not intended as a limitation of the present invention. It will be apparent to those skilled in the art that various modifications and variations can be made in format and details without departing from the spirit and scope of the invention as disclosed in the appended claims.

The invention claimed is:

1. An electromagnetic method (EM) signal detection method based on an onshore sparker source, characterized by comprising the steps of:
    arranging an EM signal detection system near a sparker source;
    releasing, by the sparker source, an electromagnetic pulse concomitantly in a discharge and mechanical energy output process, and observing an electromagnetic response generated by the earth under the excitation of the electromagnetic pulse by means of the EM signal detection system for extracting distribution information of geo-electrical parameters; and
    moving the EM signal detection system to a new position along with the sparker source when the sparker source moves, while keeping their positions relative to each other unchanged; and
    repeating the above process after the movement is completed;
    observing and recording an actual current waveform of the sparker source discharge process through a waveform recording device.

2. The method of claim 1, characterized by further comprising:
    sending, through a control unit, a synchronous control signal to the sparker source, a response observation device used for observing and recording an earth response electromagnetic field in an EM signal detection system and the waveform recording device, wherein the synchronous control signal appoints the working time of the sparker source, the response observation device and the waveform recording device;
    wherein the working time is appointed as follows: the response observation device and the waveform recording device are started before the sparker source discharges and induces oscillation, and stop working a period of time after the sparker source finishes discharge.

3. An EM signal detection system based on an onshore sparker source, characterized by comprising:
    the sparker source, releasing mechanical energy to excite the earth and also releasing electromagnetic energy in the form of electromagnetic pulses in a discharge process; and
    the response observation device, used for observing, at a specified position, an electromagnetic response signal generated by the earth under the excitation of the electromagnetic pulses;

the waveform recording device, used for observing and recording the actual current waveform of the sparker source discharge process;

wherein the waveform recording device further comprises:
  a current waveform recording sensor for observing the actual discharge current waveform of the sparker seismic source; and
  a current waveform recording unit for recording the current waveform, wherein the working time of the waveform recording device is appointed by a synchronous control signal sent by the control unit.

4. The system of claim 3, characterized by further comprising:
  the control unit, used for sending a synchronous control signal to the sparker source, the response observation device and the waveform recording device, wherein the synchronous control signal appoints the working time of the sparker source, the response observation device and the waveform recording device.

* * * * *